Jan. 26, 1926. 1,570,694
C. L. MICHOD
VEHICLE SHIPPING BRACKET
Filed Dec. 17, 1923 2 Sheets-Sheet 1
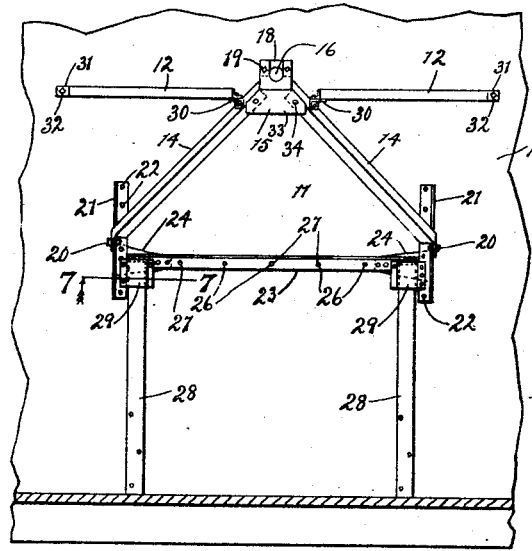
Inventor:
Charles L. Michod
Ernest E Tupes
Atty.

Jan. 26, 1926. 1,570,694
C. L. MICHOD
VEHICLE SHIPPING BRACKET
Filed Dec. 17, 1923 2 Sheets-Sheet 2
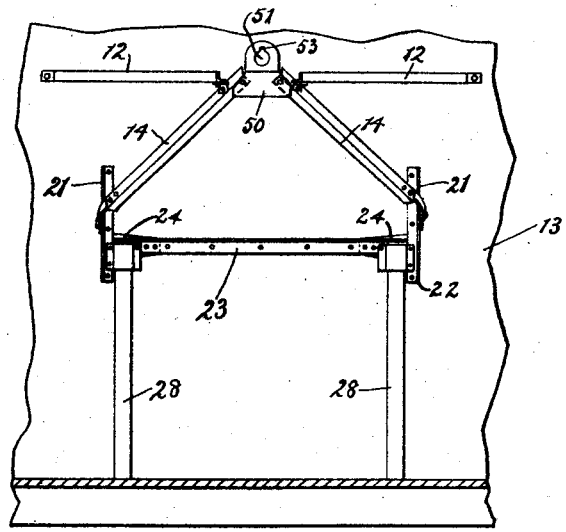
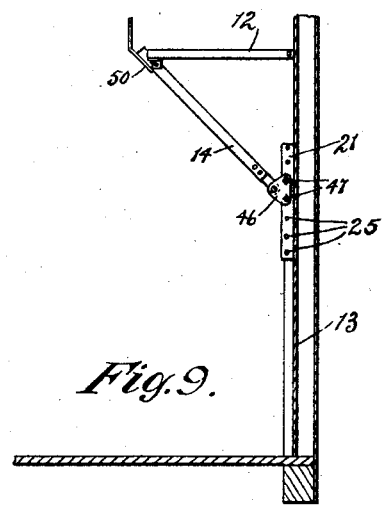
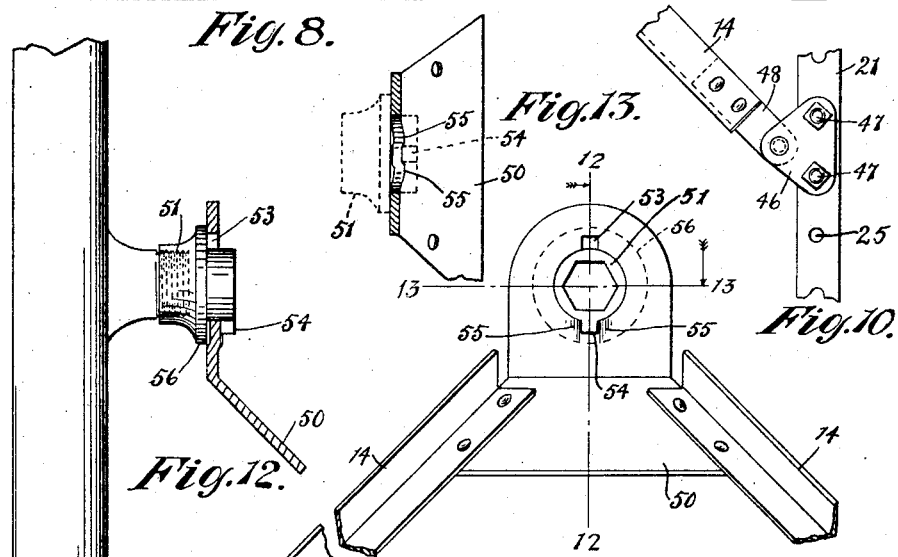
Inventor:
Charles L. Michod
By Ernest E. Jupes
Atty.

Patented Jan. 26, 1926.

1,570,694

UNITED STATES PATENT OFFICE.

CHARLES L. MICHOD, OF CHICAGO, ILLINOIS, ASSIGNOR, BY MESNE ASSIGNMENTS, OF ONE-HALF TO THE STUDEBAKER CORPORATION, OF SOUTH BEND, INDIANA, A CORPORATION OF NEW JERSEY, AND ONE-HALF TO THE COPONY AUTO LOADING COMPANY, OF DETROIT, MICHIGAN, A CORPORATION OF MICHIGAN.

VEHICLE SHIPPING BRACKET.

Application filed December 17, 1923. Serial No. 681,212.

*To all whom it may concern:*

Be it known that I, CHARLES L. MICHOD, a citizen of the United States, and resident of Chicago, in the county of Cook and State of Illinois, have invented certain new and useful Improvements in a Vehicle Shipping Bracket, of which the following is a specification.

The invention relates to an improved vehicle shipping bracket and more particularly to a device adapted to support automobiles in transit at sufficient height above the floor of the freight car in which the vehicles are being shipped so that other automobiles may be positioned underneath and the carrying capacity of the car be utilized to the best advantage.

The primary object of the invention is to provide a relatively light weight shipping device which is capable of supporting safely one corner of an automobile in transit.

Another object is the provision of a vehicle shipping device which is collapsible so as to occupy a minimum amount of storage or shipping space when not in use.

A further object is to provide a bracket adapted to support a vehicle on the wall of a car in which it is being shipped.

A still further object is the provision of a vehicle shipping bracket of simple construction which can be easily assembled or taken down with a minimum expenditure of time and energy.

Another object is to provide a hubcap of economical construction which is adapted for use with the bracket and other vehicle shipping devices to securely fasten the hub of the vehicle to the bracket.

The invention further resides in such features of construction and arrangements of parts and combinations as will hereinafter appear.

Referring to the accompanying drawings;

Fig. 1 is an elevational view of a portion of the side wall of a car showing the device mounted thereon;

Fig. 2 is a section through the side wall of the car showing an end elevation of the device;

Fig. 3 is a plan view of a pair of the devices mounted upon opposite side walls of the car showing an axle of an automobile supported and fastened thereon by its hubs;

Figs. 4 and 5 are detail views of brace fastenings;

Fig. 6 is a detail view of a mounting for the hub;

Fig. 7 is a section taken along the line 7—7 of Fig. 1;

Figs. 8 and 9 are side and end elevational views respectively of a bracket showing an alternative form of connection between the vertical and diagonal members comprising the bracket;

Fig. 10 is a detail view of the connection shown in Figs. 8 and 9;

Fig. 11 is an elevation view of the diagonal members showing the preferred form of connection of the bracket to the hub cap of the automobile, and, Figs. 12 and 13 are sectional views taken along the lines 12—12 and 13—13 respectively of Fig. 11.

Referring to the drawings, Fig. 3 shows one end of an automobile frame 10 supported by a pair of brackets generally designated by the numeral 11. The opposite end of the automobile is similarly mounted but is omitted from the drawings as being unnecessary to a proper disclosure of the invention. The bracket 11 comprises a pair of substantially horizontal arms 12 fastened at their outer ends to the side wall 13 of the car in which the automobile is to be shipped, and a pair of arms 14 extending diagonally upwardly and inwardly from the wall 13. The arms 14 converge and are connected by a plate member 15. A socket 16 in the plate member 15 provides a seat in which the hub 17 of the automobile is positioned. The lower ends of the arms 14 are connected by bolts 20 to vertical angle members 21. The members 21 are fastened to the wall 13 of the car by nails or screw bolts driven through apertures 22 in the members. A strut 23 connects the members 21 by means of plates 24. Holes 25 in the outstanding legs of the members 21 are adapted to receive the bolts 20 and provide for vertical adjustment of the arms 14 relative to the members 21.

The arms 14 support the automobile by carrying the load down into the members 21. A plurality of holes 26 in the vertical leg of the strut 23 provides means for fastening the strut to the side wall 13 of the car as by spikes or screws 27, thereby distributing the load over a considerable portion of the side wall of the car. The bracket may be reinforced if desired by providing upright members 28, with their upper ends normally out of contact with the vertical leg of the strut 23, but in position to bear against its horizontal leg and to support the bracket 11, in the event that the connection of the bracket to the side wall 13 fails under excessive strains such as would result if the car were derailed and bumped along over the ties or because of defects in the side wall of the car which makes it unsafe as a connection and support for the members 21 and strut 23. The members 28 may be nailed to the wall of the car and project up into a socket which is formed by spot-welding or otherwise fastening a plate 29 to the members 21 and strut 23, as shown in Fig. 7.

The arms 12 may be inclined to the horizontal but are preferably mounted in a horizontal position as shown, since in that position they are best adapted to prevent any tendency of the automobile to move relative to the car as a result of the sudden starting or stopping of the car and the centrifugal forces occasioned when the car rounds sharp curves at a high speed. When fastened in a horizontal position these arms do not carry any load but serve as ties preventing any tendency of the arms 14 to pivot about the bolts 20 as horizontal axes. The inner ends of the arms 12 are pivotally connected to the adjacent arms 14 by an angle member 30. The angle member 30 is pivotally connected to both of the adjacent arms 12 and 14 thereby permitting the arm 12 to be swung either vertically or horizontally as desired when fastening the outer ends to the car wall. The outer ends of the arms 12 are connected to the side walls 13 of the car by a plate 31 as before shown in Fig. 4, the plate being fastened by screws or spikes 32 as desired. The device comprises a frame made up of a plurality of members capable of being constructed from standard structural material and having detail connections of simple construction which permit adjustability of the various parts in conformity with any desired distance of the hub supporting member 15 from the side wall of the car. By moving the outer ends of the arms 12 closer together and permitting the arms 14 to tilt downwardly about the bolts 20 as a pivot, the distance of the member 15 from the wall of the car may be increased while opposite movement of the members 12 and 14 will bring the member 15 closer to the wall of the car. The folding up of the device when not in use is accomplished by removing one of the bolts 20 which connects the arm 14 to the member 21.

The plate member 15 comprises an inclined portion 33, adapted for pivotally fastening the inclined arms 14 as by a rivet or bolt 34 and a vertical portion in which the socket 16 is formed. A bar 18, fastened by bolts 19, serves to hold the hub securely in position. A packing ring 35, of fiber or rubber, is provided to prevent vibration of the hub in the socket 16 and the scarring of the same if supported in direct contact with the member 15.

In Figs. 8, 9, 10 and 11 is shown another means of connecting the diagonally extending arms 14 with the vertical angle members 21, where the connection takes the form of a plate 46, fixedly fastened to the members 21 by the bolts 47 and a bar 48, mounted on the lower end of the arm 14. The plate 46 projects beyond the angle 21, so as to provide room for pivotally mounting the bar 48 thereon, the latter having its end rounded and stopping short of the angle 21 so as to permit free rotation of the arm about its pivot. The connection is vertically adjustable by mounting the bolts 47 in the various holes 25 of the angle members 21 as desired.

The invention further resides in the provision of a novel means of connecting and locking the vehicle to supporting frames or brackets and comprises in its preferred form, as best shown in Figs. 12, 13 and 14, a plate member 50, forming part of the frame or bracket and which is provided with an aperture 52, adapted to receive the outer end of a hub cap 51. The caps 51 are threaded for mounting the ends of each hub in the usual manner and are preferably rotated until they are within approximately one revolution of their final position. The brackets are mounted upon the car wall except for the connection of the outer ends of the arms 12, and the vehicle, having been raised to its required elevation, is then mounted on the frames or brackets by inserting the caps 51 into the apertures 52, with a shoulder 56, forming part of the cap in contact with the plate member. The aperture 52 is of slightly larger diameter than the cap. A notch 53, opening into the aperture is adapted to permit of the passage therethrough of a lug 54, which is mounted on the outer end of the cap. The lug 54 is so positioned that it is on the outside of and clears the plate member 50, when the cap 51 is mounted therein. The cap is locked to the plate member 50 by rotating the cap through one-half of a revolution, the plate for this purpose being provided opposite the notch 53 with slightly projecting lips 55, over one of which the lug 54 is forced when the cap is rotated. The lug 54 rests between the lips 55 and thereby holds the cap against further rotation and securely locks the vehicle to the bracket or supporting frame.

Thus it will be seen that I have provided a collapsible bracket shipping device adapted to support automobiles in transit which is adjustable to car bodies and wheel bases of different widths and which is of light weight and economical construction, and that I have also provided a novel means for mounting and fastening a vehicle to the brackets or supporting members.

I claim:

1. A bracket of the class described, comprising a member adapted to fixedly fasten the hub portion of an axle thereto, a pair of upwardly converging arms pivotally connected to said member and having means on their lower ends adapted to fasten said converging arms to a car wall, and a second pair of arms each pivotally connected at one end to a corresponding one of said converging arms and each having a member on its other end adapted to fixedly fasten said second mentioned arms to the wall.

2. A bracket of the class described, comprising a pair of vertical members, a second member connecting and holding said vertical members in fixed parallel relation, all of said members being adapted to be fastened to a car wall by means of spikes or bolts driven through apertures formed therein, a pair of inwardly and upwardly extending arms pivotally and adjustably connected at their lower ends to a corresponding one of said vertical members, a member adapted to fixedly fasten the hub portion of an axle therein and having the upper ends of said inwardly and upwardly extending arms pivotally fastened thereto, and a second pair of arms each pivotally and adjustably connected at their inner ends to a corresponding one of said upwardly extending arms, and having means on their outer ends adapted to fixedly fasten said second pair of arms to the car wall, thereby holding all of the bracket members in fixed relation when mounted on the wall and permitting adjustment of the distance of the hub supporting member from the car wall.

3. A bracket of the class described, comprising a member adapted to fixedly fasten the hub portion of an axle thereto, a pair of upwardly converging arms pivotally connected to said member and having means on their lower ends adapted to fasten said converging arms to a car wall, a second pair of arms each pivotally connected at one end to a corresponding one of said converging arms and each having a member on its other end adapted to fixedly fasten said second mentioned arms to the wall, members mounted on each of said means adapted to form downwardly opening pockets, and standards secured to the wall having their upper ends positioned in said pockets.

4. In combination with a freight car, a vehicle therein, and a plurality of supporting structures for the vehicle, each of said structures comprising a bracket fastened to the car wall, each of said brackets comprising a pair of vertical members rigidly fastened to the car wall, a pair of inwardly and upwardly extendings arms pivotally connected at their lower ends to said vertical members, a plate member apertured to receive and fasten the hub portion of the vehicle therein and having the upper ends of said arms pivotally connected thereto, and a second pair of arms each pivotally connected at their inner ends to a corresponding one of said upwardly extending arms and rigidly connected at their outer ends to the car wall.

5. A vehicle supporting device comprising a frame having a vertical plate member adapted to support one end of an axle of the vehicle, said vehicle having a hub cap with a lug on its outer end and said plate member having an aperture therein of slightly larger diameter than the cap and having a notch opening into the aperture, said aperture and notch being adapted for the insertion of the outer end of the cap therethrough with the lug clearing the plate member, thereby permitting the cap to be rotated relative to the plate member.

6. A vehicle supporting device comprising a frame having a vertical plate member adapted to support one end of an axle of the vehicle, said vehicle having a hub cap with a lug on its outer end and said plate member having an aperture therein of slightly larger diameter than the cap and having a notch opening into the aperture, said cap having a shoulder intermediate the lug and the opposite end of the cap, said aperture and notch being adapted for the insertion of the outer end of the cap therethrough with the shoulder in contact with and the lug clearing the plate member, thereby permitting the cap to be rotated relative to the plate member with the shoulder and lug on opposite sides of the plate member.

7. A vehicle supporting device comprising a frame having a vertical plate member adapted to support one end of an axle of the vehicle, said vehicle having a hub cap with a lug on its outer end and said plate member having an aperture therein of slightly larger diameter than the cap and having a notch opening into the aperture, said cap having a shoulder intermediate the lug and the opposite end of the cap, said aperture and notch being adapted for the insertion of the outer end of the cap therethrough with the shoulder in contact with and the lug clearing the plate member, thereby permitting the cap to be rotated relative to the plate member with the shoulder and lug on opposite sides of the plate member, and lips projecting from the plate member in the path of the lug, said lug being forced over the lips in close contact therewith when the cap is rotated.

8. The combination with a freight car, of a vehicle therein, and a plurality of supporting structures for the vehicle, said vehicle being equipped with hub caps each having a lug on its outer end, and each of said structures having a plate member apertured to register with and receive the end of the cap, said plate member having a notch opening into the aperture adapted to register with said lug whereby the outer end of the cap may be inserted through the aperture and notch with the lug clearing the plate member and the cap rotated relative to the plate member until the lug is out of register with the notch.

Signed at Chicago, Ill., this 27th day of November, 1923.

CHARLES L. MICHOD.